United States Patent
Nakashima

(10) Patent No.: US 9,942,309 B2
(45) Date of Patent: Apr. 10, 2018

(54) PARALLEL COMPUTER SYSTEM AND METHOD FOR CONTROLLING PARALLEL COMPUTER SYSTEM

(71) Applicant: FUJITSU LIMITED, Kawasaki-shi, Kanagawa (JP)

(72) Inventor: Makoto Nakashima, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 347 days.

(21) Appl. No.: 14/718,132

(22) Filed: May 21, 2015

(65) Prior Publication Data

US 2015/0341424 A1 Nov. 26, 2015

(30) Foreign Application Priority Data

May 22, 2014 (JP) .................. 2014-106115

(51) Int. Cl.
*H04L 29/08* (2006.01)
*G06F 9/50* (2006.01)

(52) U.S. Cl.
CPC ............ *H04L 67/10* (2013.01); *G06F 9/5061* (2013.01); *G06F 9/5083* (2013.01); *G06F 2209/5017* (2013.01)

(58) Field of Classification Search
CPC ................ G06F 9/5061; G06F 9/5083; G06F 2209/5017; H04L 67/10
See application file for complete search history.

(56) References Cited

U.S. PATENT DOCUMENTS 8,825,710 B2* 9/2014 Gillen ................ G06F 9/5072 707/638
9,621,654 B2* 4/2017 Magdon-Ismail .. H04L 67/1097

2005/0183087 A1 8/2005 Kubota
2009/0037571 A1* 2/2009 Bozak ................ G06F 11/3006 709/224
2011/0138396 A1* 6/2011 Chen ..................... G06F 9/5066 718/105

(Continued)

FOREIGN PATENT DOCUMENTS

JP 2003-280933 10/2003
JP 2005-242986 9/2005

(Continued)

OTHER PUBLICATIONS

Provision descendants of child nodes vm—Google Patent Search, Jun. 19, 2017.*

(Continued)

*Primary Examiner* — Patrice L Winder
*Assistant Examiner* — Ruth Solomon
(74) *Attorney, Agent, or Firm* — Fujitsu Patent Center

(57) ABSTRACT

A parallel computer system includes computing nodes to execute a parallel program for generating computing processes that perform computations and monitoring processes and forming a monitoring hierarchical structure, each monitoring process monitors a monitoring process and a computing process arranged immediately lower than the monitoring process, each of the computing nodes operating as the computing process when the computing process is allocated to the computing node and operating as the monitoring process when the monitoring process is allocated to the computing node. Each of the computing nodes allocated to the monitoring process performs processing that changes the hierarchical structure based on a first target value serving as a target value for the total number of subordinate computing processes of the allocated monitoring process and a second target value serving as a target value for the number of monitoring processes and computing processes arranged immediately lower than the allocated monitoring process.

10 Claims, 12 Drawing Sheets

(56) References Cited

U.S. PATENT DOCUMENTS

| | | | | |
|---|---|---|---|---|
| 2012/0185776 A1* | 7/2012 | Kirshenbaum | ....... | G06F 1/3203 |
| | | | | 715/735 |
| 2012/0303670 A1* | 11/2012 | Gillen | ................... | G06F 9/5072 |
| | | | | 707/797 |
| 2013/0311543 A1 | 11/2013 | Howard | | |
| 2014/0320502 A1* | 10/2014 | Fletcher | ................ | G06T 11/206 |
| | | | | 345/440.2 |
| 2014/0325058 A1* | 10/2014 | Fletcher | ................ | H04L 43/045 |
| | | | | 709/224 |
| 2015/0134607 A1* | 5/2015 | Magdon-Ismail | ...... | H04L 43/16 |
| | | | | 707/610 |
| 2015/0163284 A1* | 6/2015 | Gooding | ............... | H04L 67/327 |
| | | | | 709/201 |

FOREIGN PATENT DOCUMENTS

| | | |
|---|---|---|
| JP | 2008-243216 | 10/2008 |
| JP | 2011-118899 | 6/2011 |
| WO | 2006/029714 A2 | 3/2006 |

OTHER PUBLICATIONS

Extended European Search Report dated Jan. 4, 2016 for corresponding European Patent Application No. 15168275.4, 7 pages.

\* cited by examiner

FIG.11

| PARAMETER NAME | NUMBER(S) | MEANING |
|---|---|---|
| num_child | 1 | TARGET VALUE OF THE NUMBER OF IMMEDIATE LOWER SUBORDINATE PROCESSES (SECOND TARGET VALUE) |
| num_descendant | 10 | THE TOTAL NUMBER OF SUBORDINATE WORKER PROCESSES |
| num_child_descendant | 5 | TARGET VALUE OF THE TOTAL NUMBER OF SUBORDINATE WORKER PROCESSES OF IMMEDIATE LOWER SUBMASTER PROCESS (FIRST TARGET VALUE) |

FIG.12

| LIST NAME | INFORMATION ELEMENTS | | | | MEANING |
|---|---|---|---|---|---|
| worker_list | worker_a | worker_b | worker_c | ... | LIST OF IMMEDIATE LOWER WORKER PROCESSES OF SUBMASTER PROCESS |
| submaster_list | sub_a | sub_b | sub_c | ... | LIST OF SUBMASTER PROCESS(ES) BEING IN DIRECTLY UNDER A SUBMASTER PROCESS |
| dead_submaster_list | sub_x | sub_y | sub_z | ... | LIST OF IMMEDIATE LOWER SUBMASTER PROCESS(ES) THAT DISAPPEARANCE IS DETERMINED |

PARALLEL COMPUTER SYSTEM AND METHOD FOR CONTROLLING PARALLEL COMPUTER SYSTEM

CROSS-REFERENCE TO RELATED APPLICATION

This application is based upon and claims the benefit of priority of the prior Japanese Patent Application No. 2014-106115, filed on May 22, 2014, the entire contents of which are incorporated herein by reference.

FIELD

The present disclosure relates to a parallel computer system and a method for controlling the parallel computer system.

BACKGROUND

Programs used in a parallel computer system including a plurality of computing nodes include a master-worker type parallel program. Master-worker type parallel programs include a single-layer master-worker type parallel program and a multi-layer master-worker type parallel program.

In a single-layer master-worker type parallel program, a computing task to be executed by the parallel program is divided into a plurality of subtasks. Each subtask may be executed on an arbitrary computing node belonging to a computer cluster. The subtask, execution of which is started, terminates within a finite time period in the absence of an abnormality in the computing node (e.g., a hardware fault or a software fault in the computing node).

There are times when execution of a given subtask depends on a result of execution of a different subtask. For example, when subtask A is dependent on a result of execution of subtask B, execution of subtask A is started after termination of execution of subtask B. Subtasks having no interdependence may be executed concurrently (in parallel).

In the single-layer master-worker type parallel program, one master process and a plurality of worker processes are generated. These processes are generated on computing nodes available for the parallel program (all computing nodes of a computing cluster may be available or computing nodes alone which are allocated units called jobs may be available).

The master process performs management and execution control of subtasks. Each worker process executes a subtask at the request of the master process. The master process searches for a subtask, execution of which may be started, and requests a worker process to execute the subtask. The requested worker process starts executing the subtask. When the execution of the subtask terminates, the worker process notifies the master process of the termination of the execution and results of the execution. The master process compiles execution results. With termination of execution of all the subtasks, the task of the parallel program terminates.

The master process also monitors the status (operation) of each worker process. The master process may sense whether a subtask is being normally executed by a method, such as periodical communication with each worker process. When a subtask terminates abnormally due to an abnormality in a computing node, the master process determines that a worker process having executed the abnormally terminated subtask is in an abnormal state. The master process excludes the worker process determined as being in an abnormal state from a group of available worker processes. At this time, the master process requests a different worker process to execute the subtask having been executed by the worker process determined as being in an abnormal state.

In a multi-layer master-worker type parallel program, one master process, a plurality of submaster processes having a fixed hierarchical structure, and a plurality of worker processes are generated. The master process does not directly monitor a worker process but monitors a submaster process. Each submaster process monitors a worker process subordinate to itself. In this manner, overall monitoring of the worker processes is performed.

For further information, see Japanese Laid-Open Patent publication No. 2011-118899, Japanese Laid-Open Patent publication No. 2005-242986, Japanese Laid-Open Patent publication No. 2003-280933, and Japanese Laid-Open Patent publication No. 2008-243216.

In a single-layer master-worker type parallel program, a single master process monitors all worker processes. This causes a monitoring load on the master process to increase in proportion to the number of worker processes. Thus, execution of a large-scale master-worker type parallel program may involve an enormous monitoring cost of a master process. In contrast, in a multi-layer master-worker type parallel program, the number of processes to be directly monitored by a master process and the number of processes to be directly monitored by each submaster process are smaller. This makes a monitoring load to be borne by one process lower than a monitoring load in the single-layer master-worker type parallel program.

The multi-layer master-worker type parallel program, however, suffers from the problem below. In the single-layer master-worker type parallel program, the master process alone is a process irrelevant to subtask execution. For this reason, one computing node alone which executes the master process is a computing node which does not perform actual computation processing. In contrast, in the multi-layer master-worker parallel type program, neither the master process not a submaster process executes a subtask. Since the multi-layer master-worker type parallel program has a larger number of computing nodes which do not perform actual computation processing than in the single-layer master-worker type parallel program, as described above, the multi-layer master-worker type parallel program suffers from the problem of lower efficiency of computing node utilization (node utilization efficiency).

SUMMARY

According to an aspect of the embodiments, a parallel computer system includes a plurality of computing nodes capable of executing a parallel program for generating a plurality of computing processes that perform respective predetermined computations and a plurality of monitoring processes and forming a monitoring hierarchical structure, each monitoring process monitoring a monitoring process and a computing process arranged immediately lower than the monitoring process, each of the computing nodes operating as the computing process when the computing process is allocated to the computing node and operating as the monitoring process when the monitoring process is allocated to the computing node. Each of the computing nodes, which is allocated the monitoring process, performs processing that changes the monitoring hierarchical structure based on a first target value serving as a target value for the total number of subordinate computing processes of the allocated monitoring process and a second target value serving as a target value for the number of monitoring processes and computing processes arranged immediately lower than the allocated monitoring process.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIG. 11 is a diagram illustrating a table which represents parameters used in processing by a submaster process (which may be a master process);

FIG. 12 is a diagram illustrating a table of a group of lists to be managed by a submaster process (which may be the master process) in processing by the submaster process.

DESCRIPTION OF EMBODIMENTS

An embodiment of the present invention will be described below with reference to the drawings. The configuration of the embodiment is merely illustrative, and the present invention is not limited to the configuration of the embodiment.

<Example of Configuration of Parallel Computer System>

Figure 1:
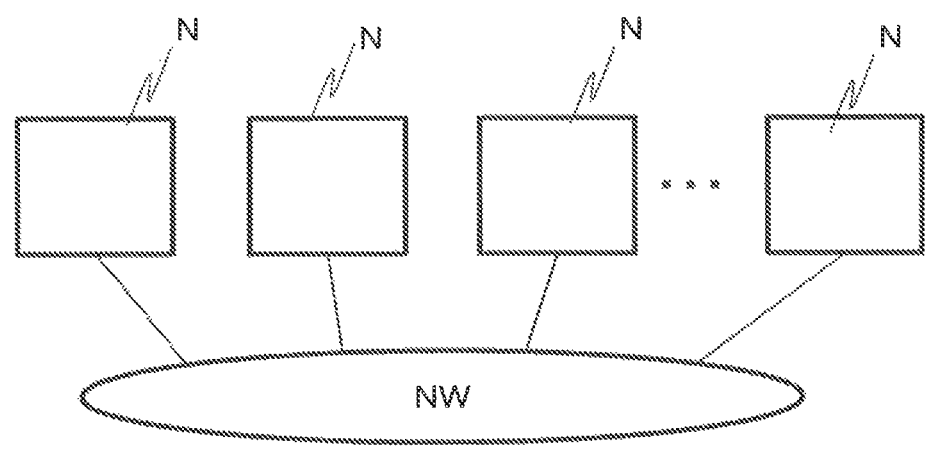
FIG. 1 illustrates an example of a parallel computer system.

FIG. 1 illustrates an example of the configuration of a parallel computer system which executes a master-worker type parallel program (hereinafter simply denoted as a "parallel program"). The parallel computer system includes a computer cluster in which a plurality of computing nodes N are connected via a network (NW).

Figure 2:
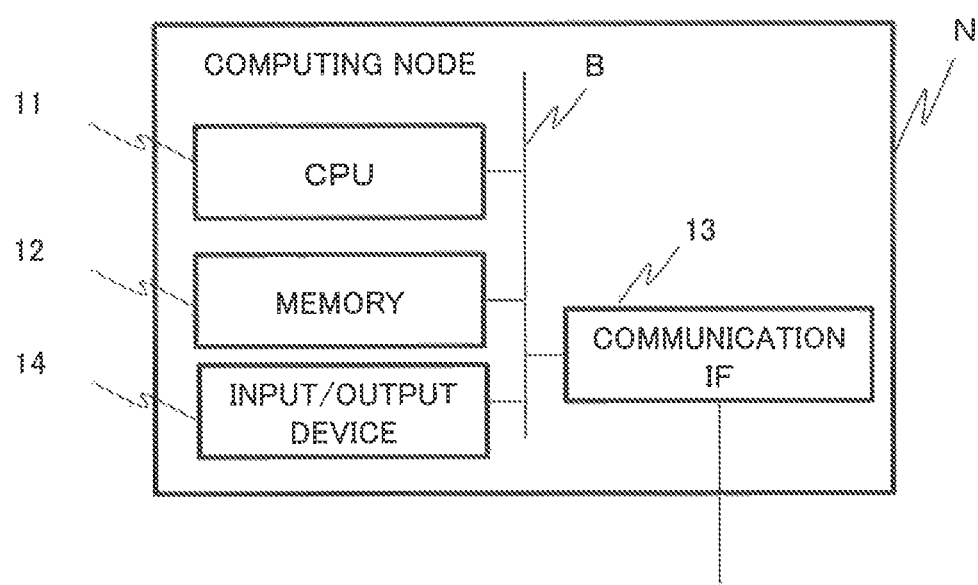
FIG. 2 illustrates an example of the configuration of a computing node.

FIG. 2 is a diagram illustrating an example of the configuration of each computing node N. The computing node N is a computer including a processor and a memory. For example, a general-purpose computer, such as a personal computer (PC), or a dedicated computer is adopted. Note that the parallel computer system may be one or two or more computers including a computer cluster which is formed of a plurality of processors and a plurality of memories connected over an internal network. Each computing node N knows (stores in a storage device) a communication address of the different computing node N, and communication is possible between the computing nodes N.

Referring to FIG. 2, the computing node N includes a central processing unit (CPU) 11, a memory 12, a communication interface (communication IF) 13 with the network (NW), and an Input/Output (I/O) apparatus (console) 14. These are connected via a bus each other. The CPU 11 is an example of a processor (control device, or controller).

The memory 12 includes a nonvolatile storage medium and a volatile storage medium. The nonvolatile storage medium is, for example, a read only memory (ROM), a hard disk, a solid state drive (SSD), an Electrically Erasable Programmable Read-Only Memory (EEPROM), or a flash memory. The nonvolatile storage medium stores programs to be executed by the CPU 11 and data to be used on execution of the program. The programs include a parallel program (process control program). The volatile storage medium is, for example, a random access memory (RAM) and is used as a work area of the CPU 11. The memory 12 is an example of a "storage device" or a "storage medium."

The communication IF 13 is a device which is responsible for signal conversion and protocol conversion relating to communication. The CPU 11 loads and executes a parallel program stored in the memory 12, thereby operating as any one of a master process, a submaster process, and a worker process to be described below. In the present embodiment, each of a master process, a submaster process, and a worker process operates on one computing node N. The computing nodes N perform interprocess communication by exchanging messages via the network (NW).

The I/O apparatus 14 includes an input device which is formed of at least one of a key, a button, a pointing device (e.g., a mouse or a touch panel), and the like and a display device (display). The input device is used by an operator (user) to input information. The display device displays information.

<Parallel Program>

A parallel program according to the embodiment will be described. In the parallel program, a computing task for executing a submitted master-worker type job (hereinafter simply called a "job") is divided into a plurality of subtasks. The computing task is an example of "processing" to be performed through execution of the parallel program, and each subtask is an example of "part of processing" and an example of a "computation" or "calculation".

A master process, submaster processes, and worker processes are generated on the plurality of computing nodes N used for execution of the parallel program. Each computing node N operates as the master process, a submaster process, or a worker process. In the description below, a master process, a submaster process, and a worker process may be simply denoted as "process(es)" unless the processes are to be distinguished.

The master process performs management and execution control of subtasks. That is, the master process searches for and selects a subtask which has become executable at each time point during execution of a job and generates a worker process (allocates the worker process to the computing node N). The worker process executes the selected subtask and returns an execution result to the master process. After the return of the execution result, the worker process terminates (disappears). A submaster process performs management (status monitoring (abnormality detection), receipt of an execution result, and the like) of a worker process which is subordinated to the submaster process itself.

In the parallel program according to the present embodiment, the master process and submaster processes form a monitoring hierarchical structure. That is, a tree having the master process as a root and a plurality of submaster processes with a hierarchical structure is formed. The master process and each submaster process may have at least one of submaster processes and worker processes as "immediate lower subordinate processes (child processes)," each of which is in directly under a master process or a submaster process. The master process and each submaster process may manage (monitor) the immediate lower subordinate processes. Each of the master process and the submaster process is an example of a "monitoring process," and a worker process is an example of a "computing process."

In the parallel program according to the present embodiment, a process monitoring structure (the monitoring hierarchical structure) is dynamically changed to achieve reduction in monitoring load and improvement in the efficiency of computing node utilization. That is, in the present embodiment, processing relating to generation and disappearance of a submaster process and processing relating to transfer of a right of management of a worker process between submaster processes (change of an arrangement position of the worker process in the hierarchical structure) are executed during execution of a job.

When a job is allocated to a plurality of computing nodes N as computing resources, a group of computing nodes N capable of executing the job (a computing node group) and a time period for which the computing node group is to be used are determined. All of the plurality of computing nodes N may be allocated to the job or some of the plurality of computing nodes N may be allocated to the job, depending on the scale of computing resources requested by the job. During execution of the job, the computing nodes N constituting the computing node group allocated to the job may each operate as any one of the master process, a submaster process, and a worker process depending on process allocation.

The number of worker processes operating concurrently (in parallel) changes continuously with progression of computation relating to a computing task during execution of a job. A preferred monitoring hierarchical structure formed of the master process and submaster processes changes depending on the number of worker processes.

For example, computing resources needed for monitoring and a time period to detect an abnormality in a worker process increase with increase in the number of processes as an object to be monitored. When the number of worker processes is enormous, allocation of computing resources needed for monitoring may be impossible. When a processing time period for detecting an abnormality in a worker process increases, the immediacy of recovery processing from a state in which an abnormality is occurring and/or the immediacy of result collection processing at the time of termination of a subtask become lower. When the number of monitoring layers is increased, the ratio of computing resources available to worker processes to computing resources available for job execution decreases.

For this reason, it is assumed that a time period needed by each of the master process and a submaster process to determine, for each of all immediate lower subordinate processes, each of which is in directly under the master process or the submaster process, whether to cause disappearance (whether to cause the immediate lower subordinate process to disappear) is monotonically non-decreasing with respect to the number of processes as an object to be determined. Also, assume that a time period needed by a given high-order process to monitor one subordinate process in low-order has an almost constant value, regardless of at which position of the hierarchical structure the subordinate process is positioned.

It is conceivable on the above-described assumptions that more efficient monitoring is achieved when submaster processes and worker processes are arranged for individual submaster processes such that the numbers of immediate lower subordinate processes are as uniform as possible among the master process and submaster processes present at each time point during job execution.

When the numbers of immediate lower subordinate processes are non-uniform, the problem below occurs. When the number of worker processes subordinate to given submaster process X is larger than the number of worker processes subordinate to a different submaster process when submaster processes perform periodic or regular monitoring, a time period for monitoring processing by submaster process X is longer than a time period for monitoring processing by the different submaster process.

For example, it is assumed that a case where the number of subordinate processes as an object to be monitored by submaster process X is 3 while the number of all immediate lower subordinate processes of the different submaster process is 2. In this case, when a time period for monitoring processing on one subordinate process has a constant value, a time period for monitoring processing on submaster process X is longer than a time period for monitoring processing on the different submaster process.

As a result, a total time period needed to perform overall monitoring processing on submaster processes once is affected by the time period for the monitoring processing in submaster process X and is made longer. To avoid prolongation of monitoring processing, processes (submaster processes and worker processes) are arranged in the parallel program according to the present embodiment such that the numbers of immediate lower subordinate processes are uniform.

When the numbers of subordinate processes present immediately lower than given processes are uniform, parameters which determine a monitoring hierarchical structure are two parameters: (1) the "total number of worker processes" and (2) the "number of immediate lower subordinate processes." A depth of layers (layer depth: the number of submaster processes existing between a master process and worker processes) depends on the two parameters.

In the present embodiment, each submaster process is notified of a target value for the "total number of subordinate worker processes" and a target value for the "number of immediate lower subordinate processes." The notified submaster process controls the submaster process itself and a subordinate process (a submaster process or a worker process) present immediately lower than the submaster process itself such that parameters managed by the submaster process itself are not more than the target values. The target value for the total number of subordinate worker processes is an example of a "first target value," and the target value for the number of immediate lower subordinate processes is an example of a "second target value."

A target value for the "total number of subordinate worker processes" at each level may be automatically determined from the "total number of worker processes" and the "layer depth of a submaster process" at each time point during job execution. For example, when a submaster process itself is an n-th (n is a natural number) submaster process (at an n-th level) from the master process, a target value may be computed as a number (rounded up to the whole number)

obtained by dividing the total number of worker processes by the n-th power of the number of immediate lower subordinate processes of the submaster process itself. Note that the master process is the 0th in the computation.

Figure 3:
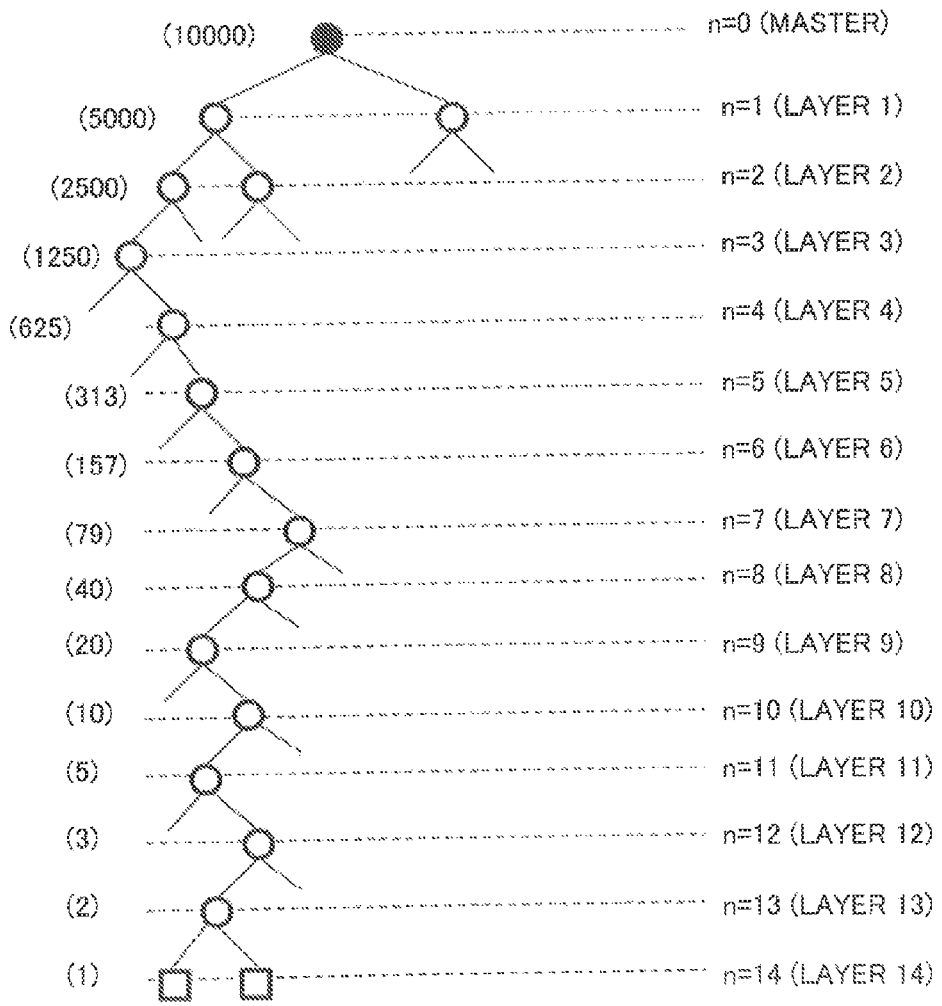
FIG. 3 schematically illustrates a monitoring hierarchical structure when the "total number of worker processes" is "10,000," and the "number of subordinate processes each of which is in directly under master process or submaster process" is "2"

By way of example, FIG. 3 schematically illustrates the monitoring hierarchical structure when the "total number of worker processes" is "10,000," and the "number of immediate lower subordinate processes" is "2." In this case, a set value (a target value for the "total number of subordinate worker processes") for an n-th submaster process may be computed as $10,000/2^n$ (rounded up to the whole number).

That is, a set value for a first submaster process (at a first layer (layer 1)) is 5,000, a set value for a second submaster process (at a second layer (layer 2)) is 2,500, and so on. A set value for a 14th one (at a 14th layer (layer 14)) or a subsequent one is 1. According to processing in a submaster process (to be described later), a submaster process with a set value of 1 is not generated or disappears. Thus, a maximum "layer depth for submaster processes" is 13 in the above-described case. One or two worker processes are arranged subordinate to each submaster process positioned at a 13th layer.

As a target value for the "number of immediate lower subordinate processes," a value corresponding to a method for implementing the master-worker type job is set. In general, when the single master process or each submaster process may monitor many immediate lower subordinate processes in a short time period, a large value may be set as the target value.

There is no limit to a method for setting a target value for the "number of immediate lower subordinate processes." A user may manually set a target value using the I/O apparatus 14 or the target value may be automatically set by a predetermined algorithm. Although the "number of immediate lower subordinate processes" may be statistically used during job execution, the number of immediate lower subordinate processes may be dynamically changed during job execution. A dynamic change may be carried out manually or by a predetermined algorithm.

Additionally, in the parallel program according to the embodiment, the master process and submaster processes perform the processing below.

(1) The master process selects a subtask which has become executable at each time point during job execution, generates a worker process, and causes the generated worker process to execute the selected subtask.

(2) The master process notifies a process subordinate to the master process of a target value for the "total number of subordinate worker processes" and a target value for the "number of immediate lower subordinate processes." The notified submaster process notifies a further subordinate submaster process, if any, of the above-described target values. In this manner, each submaster process propagates (informs) a subordinate submaster process of the target values. This causes the target values to be propagated to all submaster processes. Note that the target value for the "total number of subordinate worker processes" is updated with a value suitable for a subordinate submaster process.

(3) Each submaster process notified of the target values transfers management of a worker process corresponding to an excess to a process (the master process or a submaster process) higher in rank than the submaster process itself when the "total number of subordinate processes of the process" itself (the submaster process itself) exceeds a target value. The high-order process (the high-order submaster process), to which the management is transferred, performs the processing below. When there is a submaster process which is immediately lower than the high-order submaster process itself and has the "total number of subordinate worker processes" below a target value, the high-order submaster process transfers the management of the worker process corresponding to the excess to the submaster process. When there is no subordinate submaster process, to which management may be transferred, the submaster process, to which the management is transferred, transfers the management to a submaster process further higher order.

(4) When the "total number of subordinate submaster processes" is not more than the target value, and the "number of immediate lower subordinate processes" exceeds the target value, the submaster process generates a submaster process immediately lower than the submaster process itself. The submaster process transfers management of an excess of worker processes to the generated submaster process.

(5) As to a given submaster process A, even if a worker process subordinate to a submaster process B which is subordinate to the submaster process A is changed and subordinated to the submaster process A, the target value of the "number of immediate lower subordinate processes" managed by the submaster process A is sometimes not exceeded. In this case, the submaster process A changes the worker process subordinate to the submaster process B such that the worker process is subordinate to the submaster process A and causes the submaster process B to transfer management of the changed subordinate process to the submaster process A. At this time, the submaster process B performs spontaneous termination processing or terminates in accordance with an instruction from the high-order process.

<Processing in Submaster Process>

An example of processing by a submaster process will be described. FIGS. 4 to 10 are flowcharts illustrating an example of processing by each submaster process. FIG. 11 is a diagram illustrating a table representing parameters used in processing by a submaster process (which may be the master process). FIG. 12 is a diagram illustrating a table of a group of lists to be managed by a submaster process (which may be the master process) in processing by the submaster process.

The processing illustrated in FIGS. 4 to 10 illustrates the specific details of the processing by a submaster process illustrated in (3) to (5) above. The processing illustrated in the flowcharts is executed by the CPU 11 of the computing node N operating as a submaster process. The parameters illustrated in FIG. 11 and the group of lists illustrated in FIG. 12 are stored in the memory 12 of the computing node N operating as the submaster process.

Referring to FIG. 11, "num_child," "num_descendant," and "num_child_descendant" are stored as parameters in the memory 12 of the computing node N operating as a submaster process (the master process). The parameter "num_child" represents a target value for the number of subordinate processes which are immediately lower than (children of) the submaster process (master process) itself. The parameter "num_child" is an example of a "second target value."

The parameter "num_descendant" represents the total number of subordinate worker processes which are being executed (or execution of which is about to be started) at that time point in each of the master process and submaster processes. The parameter "num_descendant" is a value increasing or decreasing in accordance with increase or decrease in subordinate worker processes.

A value of "num_descendant" is independently computed in each of the master process and submaster processes. When the master process generates a new worker process and requests the computing N that is empty to execute a subtask by the worker process, the master process increases a value of "num_descendant" managed by the master process itself. When the master process receives a termination notification for a worker process from a lower-ranking process, the master process decreases the value of "num_descendant" managed by the master process itself.

In contrast, when a right of management of a worker process is transferred by a high-order process, a submaster process increases a value of "num_descendant" managed by the submaster process itself. When the submaster process receives a termination notification for a worker process from a lower-ranking process, the submaster process decreases the value of "num_descendant" managed by the submaster process itself.

The parameter "num_child_descendant" is a variable representing a target value for the total number of subordinate worker processes of a submaster process which is immediately lower than (a child of) a submaster process (or the master process). The variable "num_child_descendant" is an example of a "first target value."

Referring to FIG. 12, a worker list named "worker_list," a submaster list named "submaster_list," and a dead_submaster_list "dead_submaster_list" are stored as a group of lists in the memory 12 of the computing node N operating as a submaster process (or the master process).

The worker list "worker_list" is a list of worker processes which are arranged immediately lower than the submaster process itself. The submaster process performs management (e.g., monitoring) on each of the worker processes registered in the worker list. A piece of information (e.g., identification information and attribute information) on each worker process positioned immediately lower than the submaster process are registered as an information element (also called an element) in the worker list. In the example in FIG. 12, pieces of information on worker processes a, b, c, . . . are registered as "worker_a," "worker_b," "worker_c," . . . .

The submaster list "submaster_list" is a list of submaster processes which are arranged immediately lower than the submaster process itself. The submaster list includes as an information element apiece of information on each submaster process present immediately lower than the submaster process. The piece of information includes identification information of the submaster process, the number of subordinate worker processes (the number of descendent worker processes) of the submaster process, and the like. The total number of descendant worker processes increases or decreases in processing to be described later. In the example in FIG. 12, pieces of information on submaster processes a, b, c, . . . are registered as "sub_a," "sub_b," "sub_c," . . . .

The dead submaster list "dead_submaster_list" is a list of submaster processes (dead submaster processes) which are subordinate to the submaster process itself and determined to terminate (disappear). A piece of information on each dead submaster process (a piece of information registered in the submaster list) is stored as an information element in the dead submaster list. In the example in FIG. 12, pieces of information on submaster processes x, y, z, . . . are registered as "sub_x," "sub_y," "sub_z," . . . .

Figure 4:
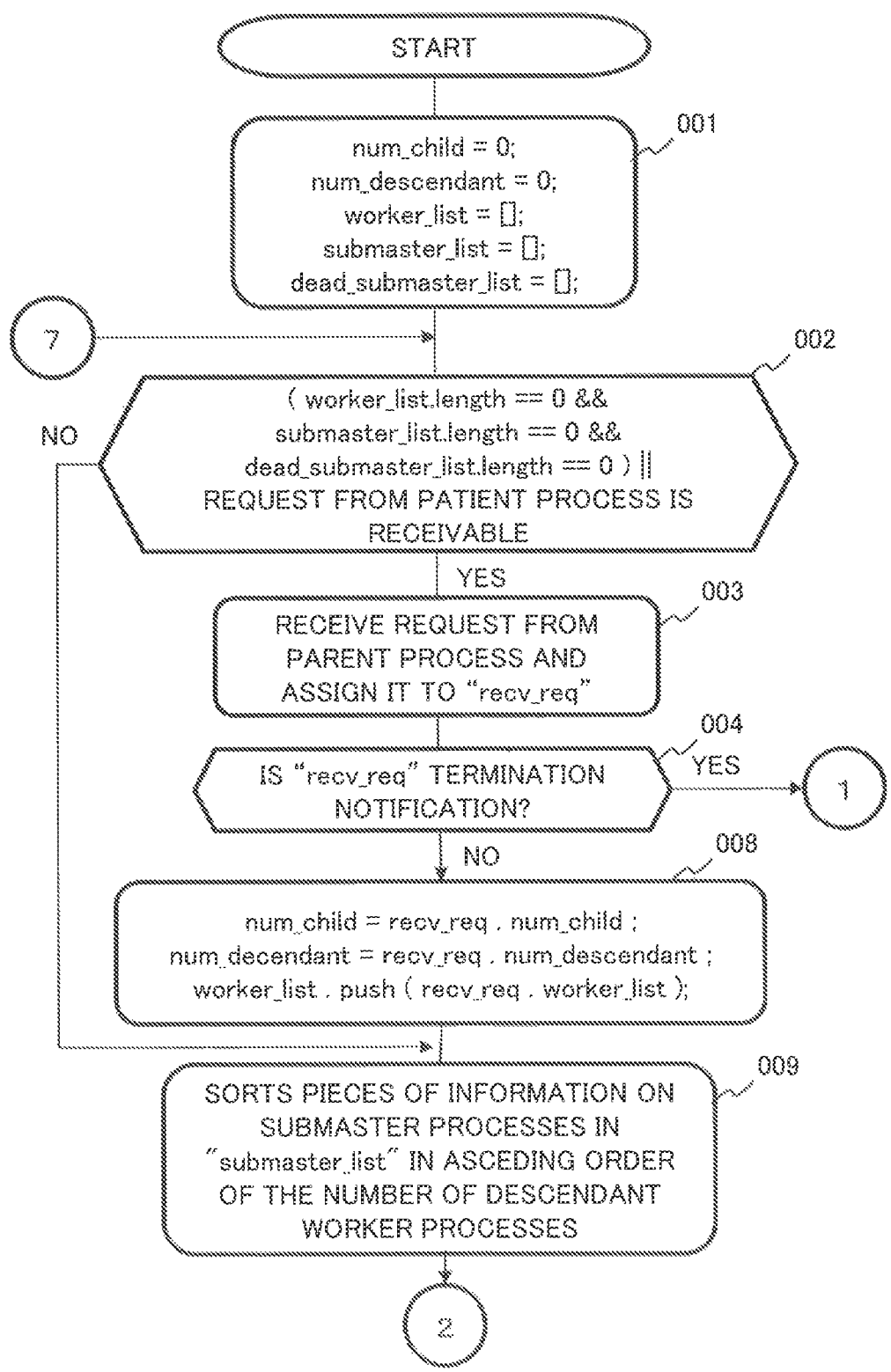
FIG. 4 is a flowchart illustrating processing in a computing node (CPU) operating as a submaster process.

Referring to FIG. 4, when the processing is started, a submaster process (the CPU 11) performs initialization in first 001. In the initialization, the submaster process sets values of a parameter "num_child" and a parameter "num_descendant" stored in the memory 12 to 0. The submaster process also sets a worker list named "worker_list," a submaster list named "submaster_list," and a dead submaster list named "dead_submaster_list" to be empty (null).

In 002, the submaster process determines whether either the condition that the numbers of elements of the worker list, the submaster list, and the dead submaster list are 0 (the lists are empty) or the condition that the submaster process may receive a request from a parent process is met. When the condition in 002 is satisfied (YES in 002), the processing advances to 003, otherwise (NO in 002), the processing advances to 009.

The parameter "worker_list.length" represents the number of elements of the worker list, the number of worker processes present immediately lower than the submaster process itself. The parameter "submaster_list.length" represents the number of elements of the submaster list, the number of submaster processes present immediately lower than the submaster process. The parameter "dead_submaster_list.length" represents the number of elements of the dead submaster list, the number of dead submaster processes. The numbers of elements are obtained, for example, by the CPU 11 through counting the numbers of elements stored in the lists. The numbers of elements may be calculated and stored in the lists in advance and be referred to in 002.

In succeeding 003, the submaster process enters a state of waiting for processing until a message including a request from the parent process comes. Upon receipt of a request, the submaster process assigns the request to a variable named "recv_req" (the contents of the request from the parent process).

Figure 5:
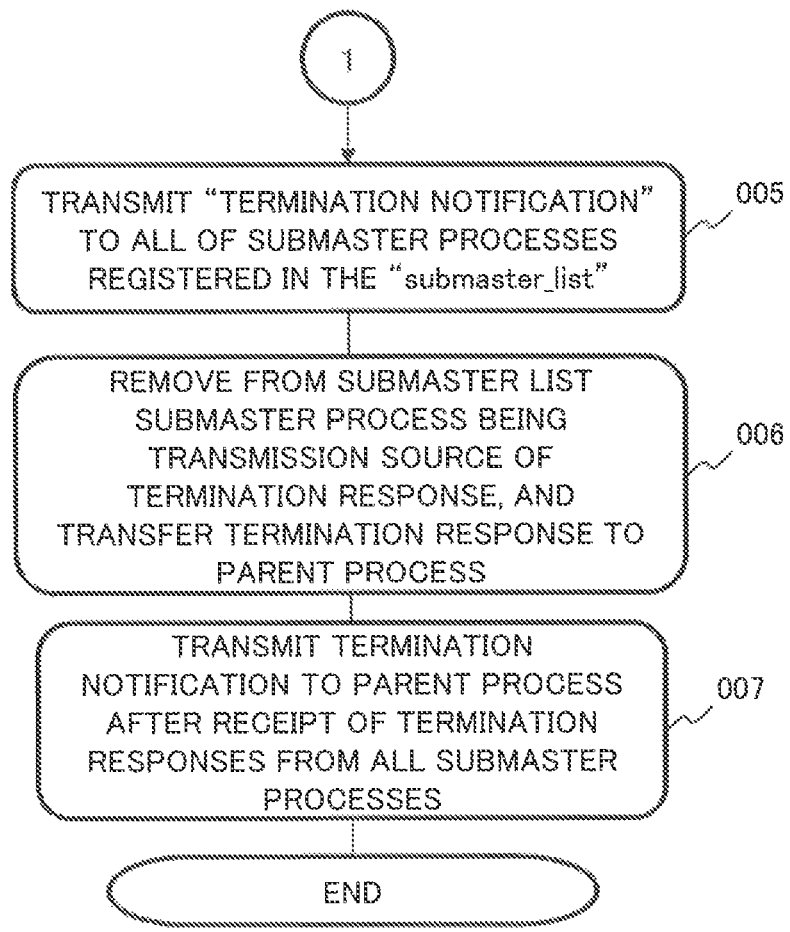
FIG. 5 is a flowchart illustrating the processing in the computing node (CPU) operating as a submaster process.

In succeeding 004, the submaster process determines whether the request assigned to the variable "recv_req" is a "termination notification" for the submaster process itself. When the request is a "termination notification" (YES in 004), the processing advances to 005 (FIG. 5). On the other hand, when the request is not a "termination notification" (NO in 004), the processing advances to 008.

In 005, the submaster process transmits a "termination notification" to all of subordinate submaster processes registered in the submaster list "submaster_list." This is to terminate the subordinate master processes with termination of the submaster process itself.

In succeeding 006, the submaster process receives a termination response from each of the subordinate submaster processes registered in the submaster list "submaster_l-ist." The submaster process then removes the submaster process which is transmission source of the termination response from the submaster list. At this time, the submaster process transmits a message including the termination response to the parent process in an appropriate way.

In succeeding 007, after receipt of the termination responses from all the submaster processes having transmitted the termination notifications, the submaster process sends a termination notification (a termination response to the termination notification from the parent) to the parent process and terminates the submaster process itself. With this termination, the submaster process disappears.

As described above, when the submaster process receives a "termination notification" from the parent process, the submaster process terminates a submaster process immediately lower than the submaster process itself, makes a report on the termination to the parent process, and then disappears. Note that when the immediate lower submaster process has a subordinate submaster process, the immediate lower submaster process also transmits a termination notification to the subordinate submaster process (004 and 005). As a result, when a given submaster process disappears, a subordinate (descendant) submaster process positioned lower in layer than the submaster process also disappears.

Referring back to FIG. 4, when the processing advances from 004 to 008, i.e., when a request other than a "termination notification" is received, succeeding processing is executed in 008. The submaster process sets (updates) the value of the parameter "num_child" stored in the memory 12 to (with) a parameter "recv_req.num_child" that represents a target value for the number of immediate lower subordinate processes specified in the request. The submaster process also sets (updates) the value of the parameter "num_descendant" stored in the memory 12 to (with) the parameter "recv_req.num_descendant" that represents a value for the parameter "num_descendant" specified in the request.

The submaster process further adds a worker list included in the request to the worker list of the submaster process itself (worker_list.push(recv_req.worker_list)). The function "worker_list.push" is a function which adds the worker list in the request to the worker list of the submaster process. A worker process registered in the worker list corresponds to a worker process as a target to be monitored present immediately lower than the submaster process. The addition to the worker list is performed by the CPU 11 through registering pieces of information on worker processes in the request as elements in the worker list on the memory 12.

In succeeding 009 and subsequent processes, the submaster process performs monitoring processing of the number of subordinate processes. In 009, the submaster process sorts pieces of information on subordinate submaster processes registered in the submaster list "submaster_list" in ascending order of (in order of increasing) the number of descendant worker processes (the total number of subordinate worker processes of a submaster process). When the processing in 009 terminates, the processing advances to 010. Note that when the submaster list is null in 009, the processing advances to 010 without the sorting.

In succeeding 010 (FIG. 6), the submaster process calculates a value of the parameter "num_child_descendant." That is, the submaster process sets, as the parameter "num_child_descendant," a value obtained by dividing the value of the parameter "num_child_descendant" in the memory 12 by the value of the parameter "num_child" in the memory 12 (stores the value in the memory 12). In 010, "div_ceil( )" means performing a division and rounding up a quotient to the whole number. As a result of the division, a value obtained by rounding up the quotient is set. The processing in 010 corresponds to the arithmetic the "total number of worker processes/(the number of immediate lower subordinate processes)'" described above, and the value of the parameter "num_child_descendant" is a "first target value," of which an immediate lower submaster process is notified.

Figure 7:
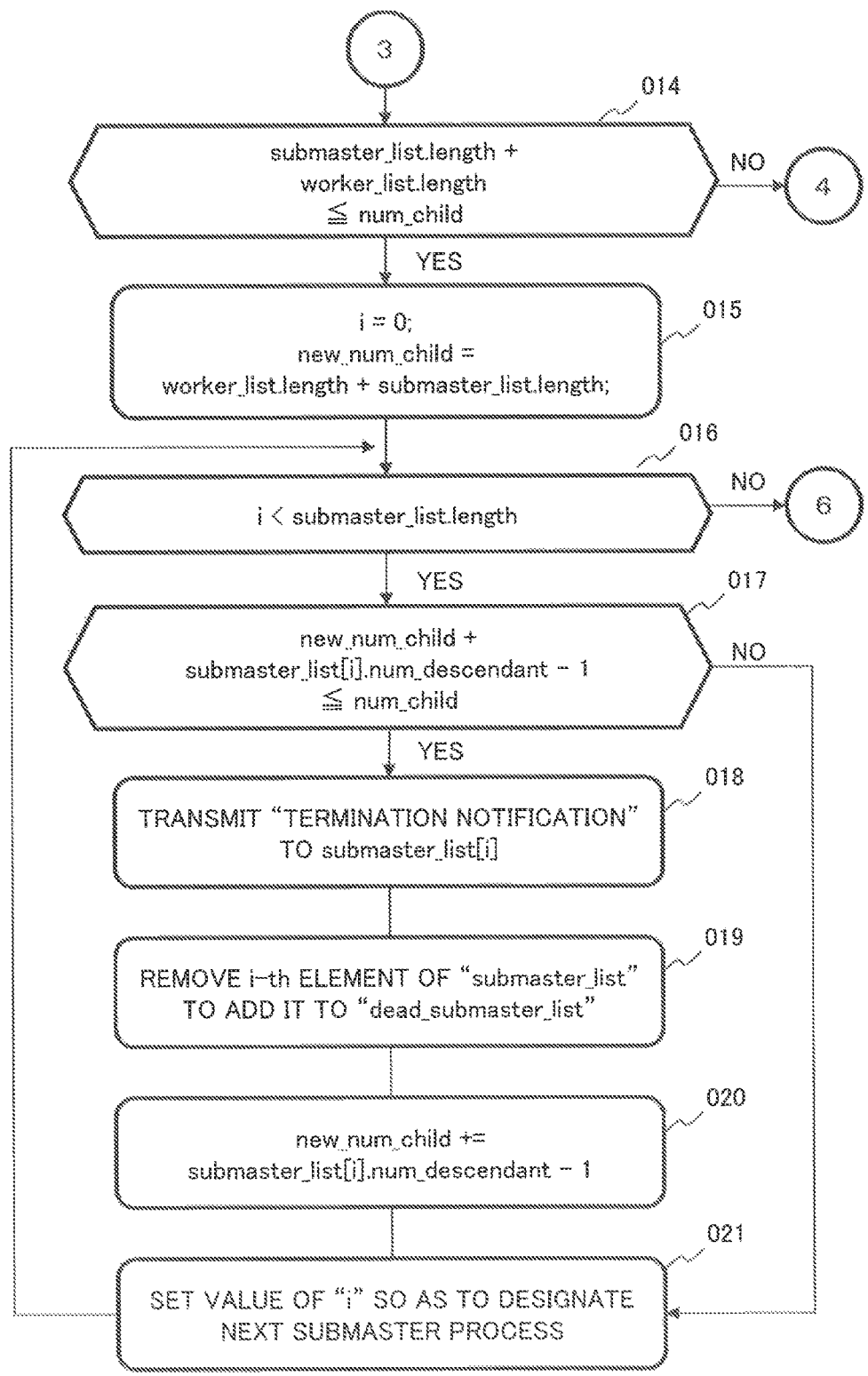
FIG. 7 is a flowchart illustrating the processing in the computing node (CPU) operating as a submaster process.

In succeeding 011, the submaster process determines whether a parameter "submaster_list.length" that represents the number of submaster processes present immediately lower than the submaster process itself is larger than the parameter "num_child" that represents a target value for the number of immediate lower subordinate processes of the submaster process (exceeds the target value). When the number of immediate lower submaster processes exceeds the target value (YES in 011), the processing advances to 012, otherwise (NO in 011), the processing advances to 014 (FIG. 7).

Note that when the submaster list is empty (null) in 011, a value of "submaster_list.length" is treated as 0, and the processing advances to 014. In subsequent processing as well, when the submaster list is null, the value of "submaster_list.length" is treated as 0.

In 012, the submaster process transmits a "termination notification" to a submaster process which is registered at the top of the submaster list "submaster_list" (a 0th submaster process: submaster_list [0]) in order to cause a submaster process corresponding to an excess over the parameter "num_child" representing the target value to disappear.

In succeeding 013, the submaster process removes a 0th element (top element) from the submaster list "submaster_list" and adds the element to the dead submaster list "dead_submaster_list." This is used for waiting for a response from the submaster process that is a destination of the "termination notification."

After that, the processing returns to 011, and the submaster process determines again whether the number of immediate lower submaster processes exceeds the parameter "num_child" that represents the target value. When the number of immediate lower submaster processes still exceeds the target value, the processing in 012 and 013 on the top of the submaster list (submaster_list [0]) is executed. In this manner, the loop processing in 011 to 013 is repeated until the number of submaster processes immediately lower than the submaster process itself is not more than the parameter "num_child" that represents the target value.

Figure 8:
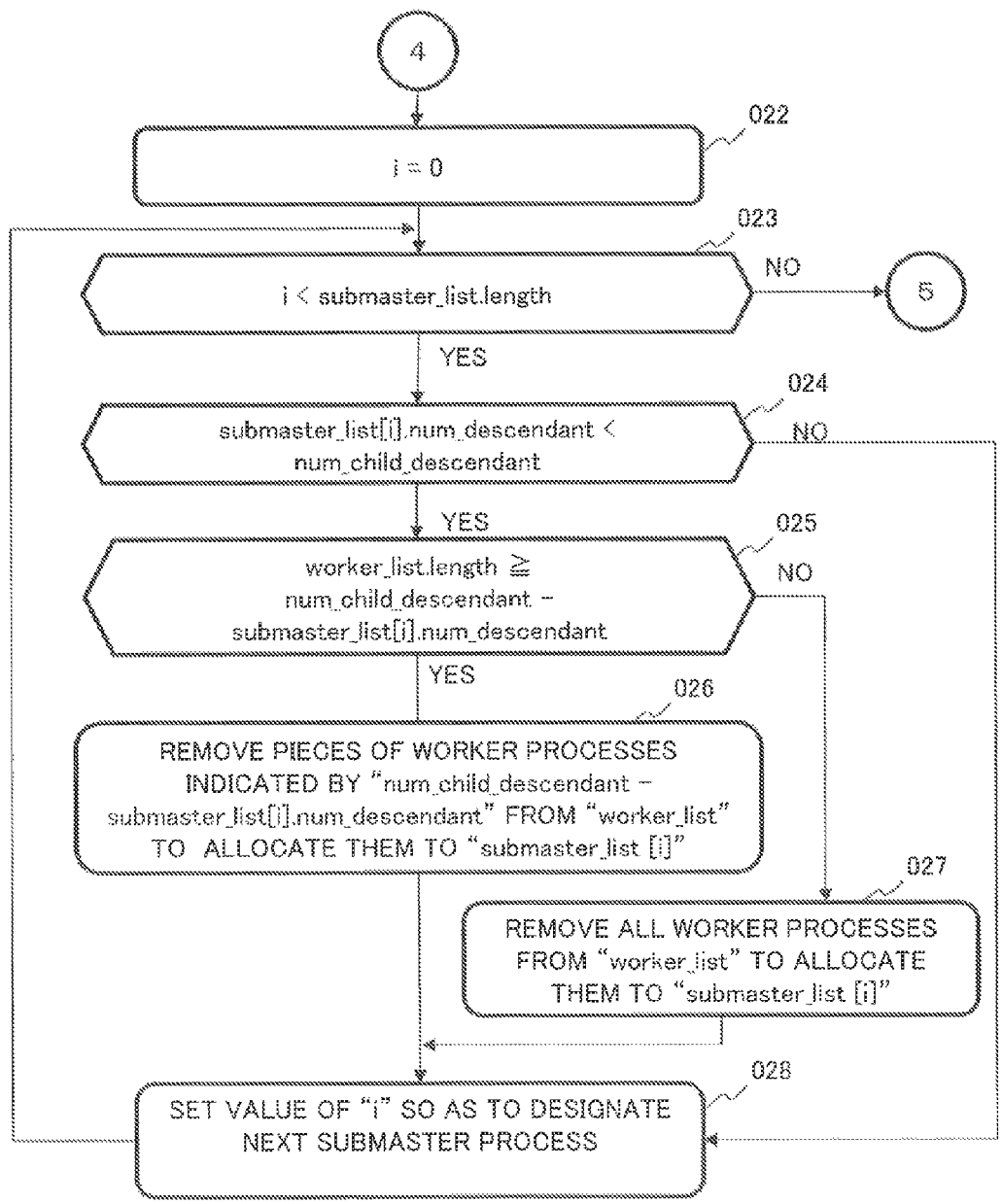
FIG. 8 is a flowchart illustrating the processing in the computing node (CPU) operating as a submaster process.

When the processing advances to 014 in FIG. 7, the submaster process works out the sum of "submaster_list.length" that represents the number of submaster processes present immediately lower than the submaster process itself and a parameter "worker_list.length" that represents the number of worker processes present immediately lower than the submaster process itself (the number of immediate lower subordinate processes (the number of child processes)). The submaster process determines whether the worked-out number of immediate lower subordinate processes is not more than "num_child" that represents the target value for the number of immediate lower subordinate processes of the submaster process itself. When the number of immediate lower subordinate processes exceeds the target value (NO in 014), the processing advances to 022 (FIG. 8). On the other hand, when the number of immediate lower subordinate processes is not more than the target value (YES in 014), the processing advances to 015.

In 015, the submaster process sets a value of a loop counter "i" to 0. The submaster process also sets, as a variable named "new_num_child," "worker_list.length+submaster_list.length" that represents the number of current immediate lower subordinate processes.

In processing in 016 to 021, the submaster process sequentially checks the numbers of subordinate processes of the immediate lower submaster processes from an i-th immediate lower submaster process (the top for the first time) of the submaster list. When the number of subordinate worker processes of an immediate lower submaster process satisfies a predetermined condition, the submaster process causes the submaster process in question to disappear. Additionally, the submaster process brings an arrangement position of a worker process subordinate to the submaster process in question to immediately lower than the submaster process itself.

Figure 10:
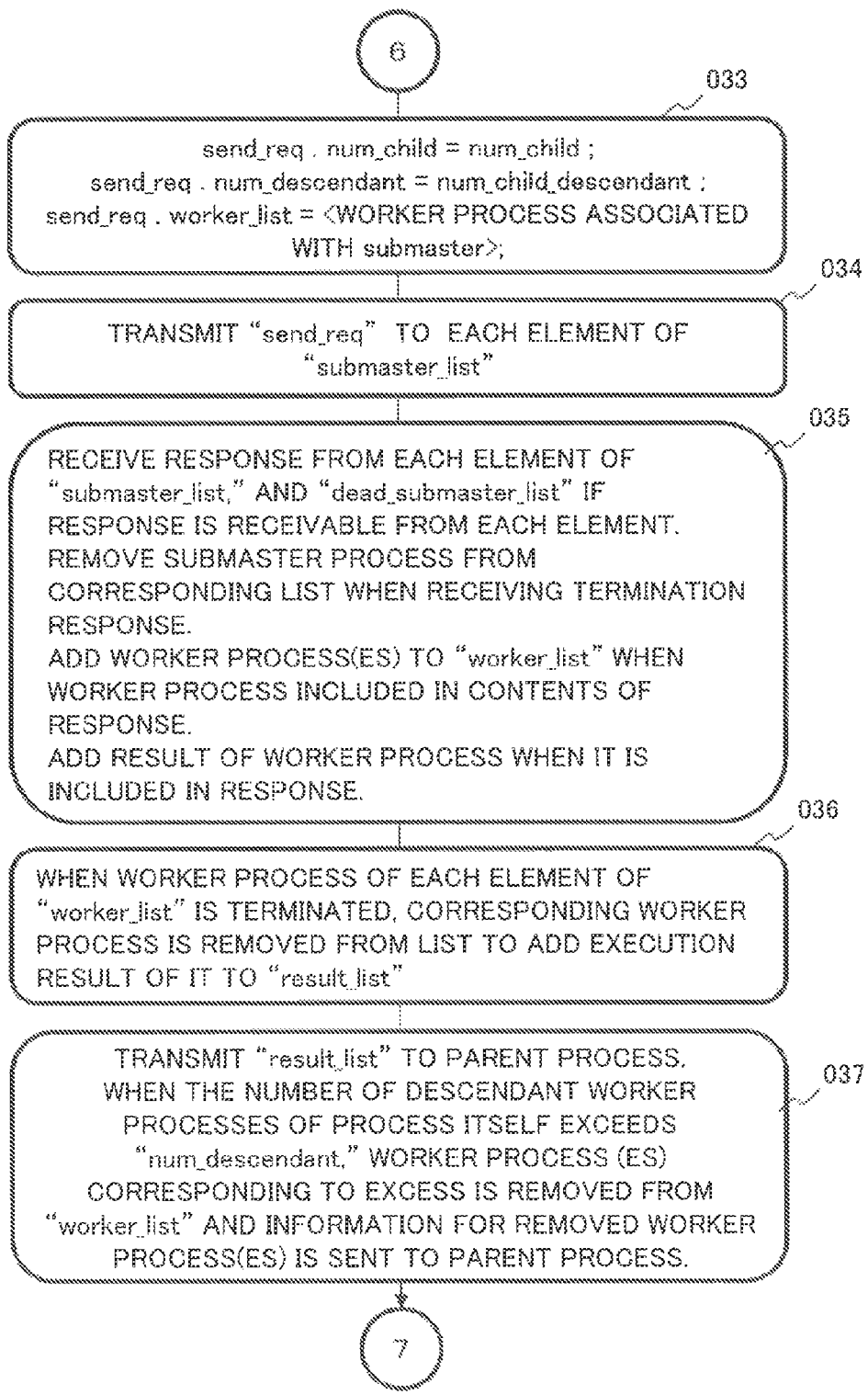
FIG. 10 is a flowchart illustrating the processing in the computing node (CPU) operating as a submaster process.

More specifically, in 016, the submaster process determines whether the value of the loop counter "i" is smaller than the parameter "submaster_list.length" that represents the number of immediate lower submaster processes. When the value of "i" is smaller than the number of immediate lower submaster processes (YES in 016), the processing advances to 017; otherwise (NO in 016), the processing advances to 033 (FIG. 10). The processing means performing the loop processing in 017 to 021 for all submaster processes in the list from the i-th (the top (=0th) for the first time) submaster process of the submaster list. An i-th element (submaster process) of the submaster list will be denoted as a "submaster process [i]" hereinafter.

In 017, the submaster process calculates a value obtained by subtracting 1 from the sum of "new_num_child" that represents the number of current immediate lower subordinate processes and "submaster_list [i].num_descendant" that represents the total number of descendant worker processes of the submaster process [i]. The submaster process determines whether the calculated value is not more than "num_child" that represents the target value for the number of immediate lower subordinate processes of the submaster process itself. When the calculated value is not more than the target value (YES in 017), the processing advances to 018; otherwise (NO in 017), the processing advances to 021.

With the processing in 017, it is checked whether a result of adding the total number of subordinate worker processes of the submaster process [i] to the number of current immediate lower subordinate processes does not exceed "num_child" representing the target value. Not exceeding the target value means that there is no problem (the number of immediate lower subordinate processes falls within a range not more than the target value) even if management of a subordinate worker process of the submaster process [i] is transferred (shifted) to a high-order process. Note that the value of 1 that is subtracted in the calculation of the calculated value represents the number of submaster processes to be caused to disappear with transfer of a right of management (rearrangement of a worker process).

In 018, the submaster process transmits a termination notification to the submaster process [i]. In succeeding 019, the submaster process removes the i-th element (submaster process [i]) from the submaster list and adds the element to the dead submaster list "dead_submaster_list."

In succeeding 020, the submaster process adds "submaster_list[i].num_descendant-1" that represents a value obtained by subtracting the number (1) of submaster process [i] from the number of descendant worker processes of the submaster process [i] to "new_num_child" that represents the number of current immediate lower subordinate processes.

In succeeding 021, the submaster process sets the value of the loop counter "i" such that the loop counter "i" points at a succeeding submaster process in the submaster list. After that, the processing returns to 016. When there is any submaster process left in the submaster list, the processing in 017 to 021 is executed.

When the processing in 017 to 021 for all submaster processes in the submaster list terminates, a negative judgment is made in 016. The processing advances to 033 (FIG. 10). Note that when a negative judgment is made in the processing in 017, the subsequent processing may be skipped, and the processing may advance to 033.

Figure 9:
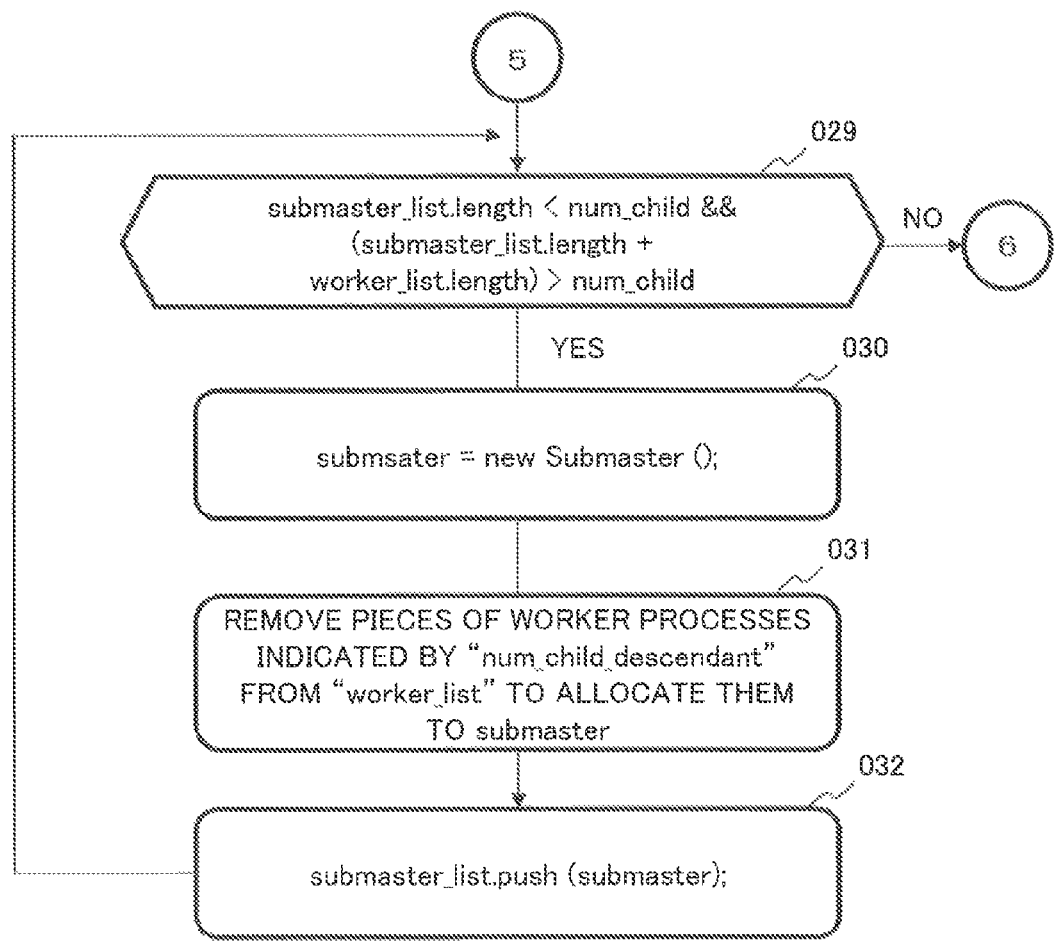
FIG. 9 is a flowchart illustrating the processing in the computing node (CPU) operating as a submaster process.

When the processing advances to 022 (FIG. 8), the submaster process sets the value of the loop counter "i" to 0. In succeeding 023, the submaster process determines whether the value of the loop counter "i" is smaller than "submaster_list.length" that represents the number of immediate lower submaster processes. When the value of "i" is smaller than the number of immediately lower submaster processes (YES in 023), the processing advances to 024, otherwise (NO in 023), the processing advances to 029 (FIG. 9).

In 024 to 028 below, the submaster process executes loop processing for transferring a right of management of a worker process immediately lower than the process itself (performing rearrangement) to a submaster process immediately lower than the process itself when the submaster process has a vacancy.

More specifically, in 024, the submaster process determines whether the parameter "submaster_list [i].num_descendant" that represents the total number of subordinate worker processes of the submaster process [i] is less than "num_child_descendant" that represents a target value for the total number of subordinate worker processes of a submaster process immediately lower than the submaster process itself. When the total number of subordinate worker processes of the submaster process [i] is less than the target value (YES in 024), the processing advances to 025; otherwise (NO in 024), the processing advances to 028.

The advancement to 025 means that the submaster process [i] may afford to manage an additional worker process. In succeeding 025, the submaster process works out a value obtained by subtracting "submaster_list [i].num_descendant" from "num_child_descendant" representing the target value. The difference means the number of worker processes which may be further allocated to the submaster process [i] (an affordable number).

The submaster process determines whether "worker_list.length" that represents the number of worker processes present immediately lower than the submaster process itself is not less than the above-described difference. When the number of worker processes is not less than the difference (YES in 025), the processing advances to 026; otherwise (NO in 025), the processing advances to 027.

In 026, the submaster process removes worker process, the number of which is equal to the difference (the affordable number), from the worker list "worker_list" and allocates the worker processes to the submaster process [i]. At this time, the submaster process increases the number of descendant worker processes of the submaster process [i] by the number of allocated worker processes. After that, the processing advances to 028. With the processing in 026, the number of subordinate worker processes present immediately lower than the submaster process [i] becomes "num_child_descendant" representing the target value.

On the other hand, when the processing advances to 027, the submaster process allocates all worker processes in the worker list (all of subordinate worker processes present immediately lower than the submaster process itself) to the submaster process [i]. This is because the affordable number for the submaster process [i] is larger than the number of worker processes immediately lower than the submaster process. At this time, the submaster process increases the number of descendant worker processes of the submaster process [i] by the number of allocated worker processes. After that, the processing advances to 028.

In 028, the submaster process sets the value of i such that the loop counter "i" points at a succeeding submaster process in the submaster list. After that, the processing returns to 023. When the processing in 024 to 028 for all submaster processes present immediately lower than the submaster process terminate, a negative determination is made in 023. The processing advances to 029 (FIG. 9).

In 029, the submaster process determines whether "submaster_list.length" that represents the number of submaster processes present immediately lower than the submaster process itself is less than "num_child" that represents the target value for the number of immediate lower subordinate processes of the submaster process itself (condition 1). The submaster process also determines whether the number of processes immediately lower than the submaster process itself (submaster_list.length+worker_list.length) is larger than "num_child" representing the target value (condition 2).

When condition 1 and condition 2 are both satisfied (YES in 029), the processing advances to 030, otherwise (NO in 029), the processing advances to 033 (FIG. 10). The advancement to 030 means that the number of immediate lower subordinate processes of the submaster process exceeds the target value while the submaster process may afford to generate a new submaster process immediately lower than the submaster process itself.

In 030, the submaster process generates a new submaster process. In succeeding 031, the submaster process removes worker processes, the number of which is equal to the target value (num_child_descendant) for the total number of subordinate worker processes of a submaster process immediately lower than the submaster process itself, from the worker list (worker_list) and allocates the worker processes (transfers a right of management) to the new submaster process. At this time, the submaster process sets the number of allocated worker processes as the number of descendant worker processes of the new submaster process.

In 032, the submaster process adds a piece of information on the new submaster process as an element of the submaster list to the submaster list. After that, the submaster process returns the processing to 029. When condition 1 and condition 2 are both satisfied in 029 (YES in 029), the processing in 030 to 032 is executed. On the other hand, a negative judgment is made in 029, the processing advances to 033 (FIG. 10).

In 033, the submaster process generates a request to be transmitted to a subordinate process of the submaster process itself. That is, the submaster process sets "num_child" that represents the target value for the number of immediate lower subordinate processes of the submaster process itself as "send_req.num_child" that is a request for transmission of "num_child." The submaster process also sets the value of "num_child_descendant" that is calculated and stored in the memory 12 in 010 as "send_req.num_descendant" that is a request for transmission of "num_descendant."

The submaster process further sets pieces of information on worker processes linked to the submaster process (allocated to the submaster process) in the earlier processing as "send_req.worker_list" that is a list for transmission of "worker_list."

In succeeding 034, the submaster process transmits a message including the requests generated in 033 to each element in the submaster list (submaster_list), i.e., each submaster process registered in the submaster list. Note that the contents of a request to be transmitted depend on how worker processes are allocated to the submaster processes.

In 035, when a message including a response from a submaster process corresponding to an element of the submaster list or a submaster process corresponding to an element of the dead submaster list has arrived, the submaster process receives the response. When the response is a termination response, the submaster process removes a submaster process which is the source of the termination response from the submaster list or the dead submaster list.

When the response contains a piece of information on a worker process (management information for the worker process, management of which is handed over by a subordinate process), the submaster process adds the piece of information on the worker process to the worker list. When the response includes a result of execution of a subtask by a worker process, the submaster process adds the result to a result list (result_list).

In 036, when a submaster process receives a termination response and a result of execution of a subtask from a worker process corresponding to an element in the worker list as a response arriving at the submaster process, the submaster process removes a piece of information on the worker process from the worker list and adds the execution result to the result list. As described above, a worker process which has terminated execution of processing requested by the master process is treated as dead.

To remove a piece of information on a worker process, the submaster process refers to the submaster list and decreases the number of descendant worker processes of a submaster process having the worker process as an immediate lower one. At this time, the submaster process decreases the value of "num_descendant."

In 037, the submaster process transmits the contents of the result list to the parent process (a submaster process or the master process) of the submaster process itself. The contents of the result list finally arrives at the master process, and the master process compiles results of execution of subtasks.

The submaster process removes a piece of information on a worker process corresponding to an excess when the number of descendant worker processes (the number of subordinate worker processes) of the process itself exceeds "num_descendant" representing the target value. The removed piece of information is transmitted to the parent process (a submaster process or the master process). The piece of information removed from the worker list is added to a worker list of the parent process in the parent process (high-order submaster process) and is treated as a worker process immediately lower than the parent process. When the processing in 037 terminates, the processing returns to 002 (FIG. 4).

<Processing in Master Process>

The master process is a process which is provided with a mechanism to select a subtask and a mechanism to generate a worker process, in addition to the above-described mechanisms of a submaster process. Although a submaster process merely receives a right of management of a worker process generated by the master process, the master process may generate a worker process by itself and make the worker process a subordinate immediately lower than the master process itself.

Figure 13:
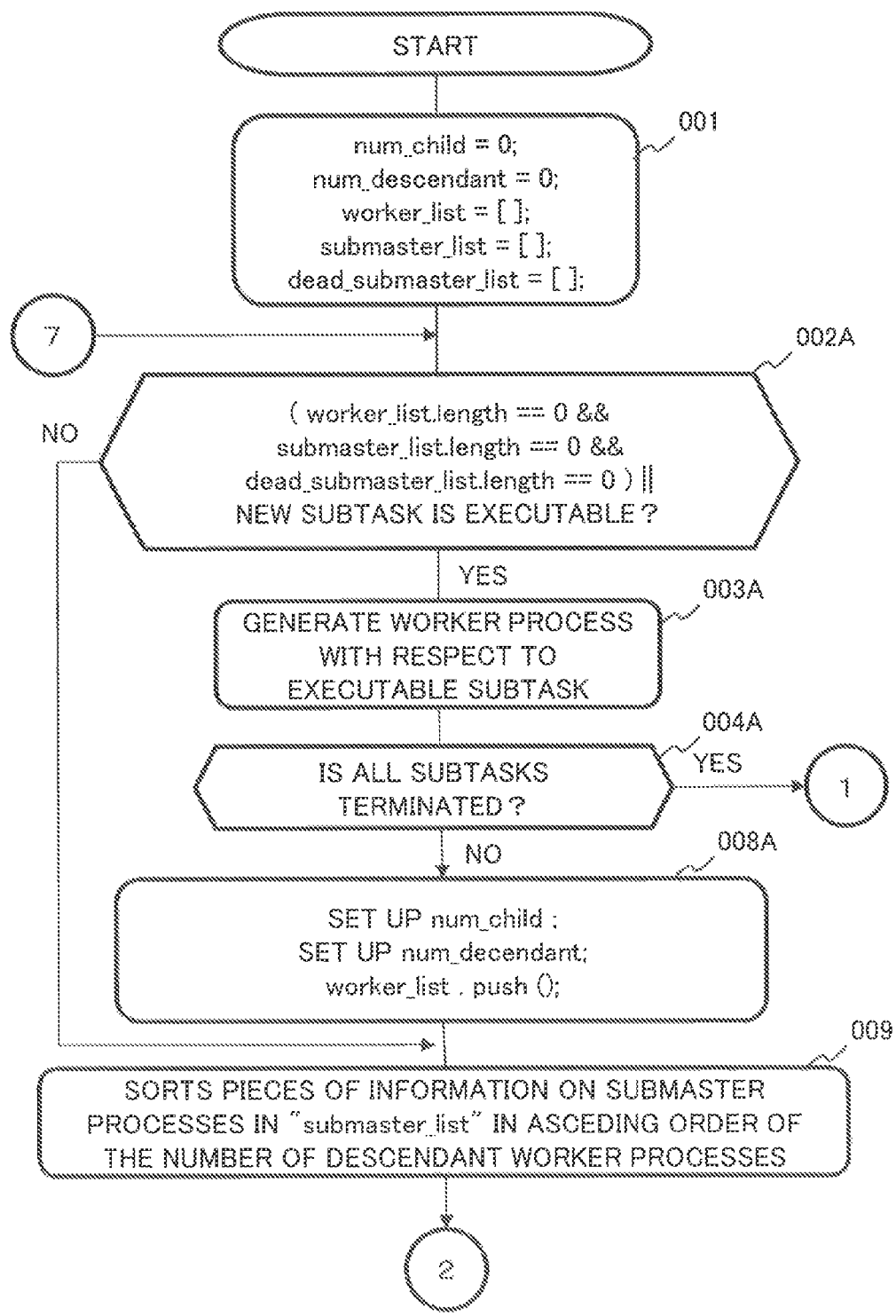
FIG. 13 is a flowchart illustrating processing in a computing node (CPU) operating as a master process.

Specific processing by the master process is almost the same as the processing by a submaster process illustrated in FIGS. 4 to 10. Note that the processing is different from the processing by a submaster process in the points below. FIG. 13 is a flowchart illustrating an example of the processing by the master process. That is, as illustrated in FIG. 13, the master process makes a judgment "as to whether a new subtask is executable" instead of a judgment "as to whether a request from a parent process may be received," in 002A corresponding to 002 in FIG. 4. When a new subtask is executable (YES in 002A), the master process generates a worker process for the executable subtask in 003A.

In succeeding 004A, the master process determines whether all subtasks have terminated. When all the subtasks have terminated (YES in 004A), the master process executes the processing in 005 to 007 and terminates the processing. Note that there is no process higher in rank than the master process. For this reason, the master process performs neither transfer of a termination response to a parent process in 006 nor transmission of a termination notification to a parent process in 007.

When all the subtasks have not terminated in 004A (NO in 004A), the master process performs the processing below in 008A. More specifically, the master process does not set a value, of which the master process is notified by a high-order process, as a value of "num_child" but sets a value of the "number of immediate lower subordinate processes" which is set through manual operation or by a predetermined algorithm (stored in advance in the memory 12) in "num_child." The master process also sets the number of worker processes (the total number of worker processes) generated in 003A as a value of "num_descendant." The master process adds a piece of information on the worker process generated in 003A. After that, the processing advances to 009.

Except for the above-described processing, the master process performs processing identical to the processing by a submaster process illustrated in FIGS. 6 to 10. A detailed description of the processing will be omitted. The master process calculates "num_child_descendant" using "num_child" and "num_descendant" set in 008A (010 in FIG. 6). The master process generates a submaster process immediately lower than the master process (030 in FIG. 9) when the number of worker processes generated in 003A surpasses "num_child." At this time, the master process allocates worker processes, the number of which is equal to "num_child_descendant," to the submaster process (031).

Additionally, the master process transmits a request including (makes a notification of) "num_child," "num_descendant" ("num_child_descendant" calculated in 010), and a worker list to the submaster process (033 and 034 in FIG. 10). With this transmission, the submaster process immediately lower than the master process may receive the request in 003 of FIG. 4. The immediate lower submaster process may set "num_child" and "num_descendant" and make an addition to a worker list in 008, and may perform subsequent processing.

<Operation During Execution of Parallel Program>

On execution of the parallel program that executes a job, for example, a master process and a needed number of submaster processes and a needed number of worker processes are generated on a plurality of computing nodes N, to which the job is allocated, and the processes are allocated to the computing nodes N, as initialization at a time point when execution of the job is started.

That is, at the start of the job execution, the master process is generated on the given computing node N, and the master process selects a subtask which is executable at the start time point and generates a worker process (allocates the worker process to a different computing node N and requests the different computing node N to execute the subtask) (003A in FIG. 11). The computing node N operating as the worker process executes the subtask.

The master process repeats processing relating to worker process generation and works out the total number (e.g., 10,000) of worker processes at the job execution start time point (003A in FIG. 11). The master process works out the total number, "5,000," of subordinate worker processes for each submaster process which is immediately lower than (a child of) the master process, using the "number of immediate lower subordinate processes" (e.g., 2) set in advance (stored in the memory 12).

The master process generates two submaster processes (allocates the submaster processes to the different computing nodes N and requests the computing nodes N to execute the submaster processes) in accordance with the "number, 2, of immediate lower subordinate processes" (the loop in 022 to 028 of FIG. 8). The master process requests each submaster process to manage (monitor) 5,000 worker processes (033 and 034 in FIG. 10).

Figure 6:
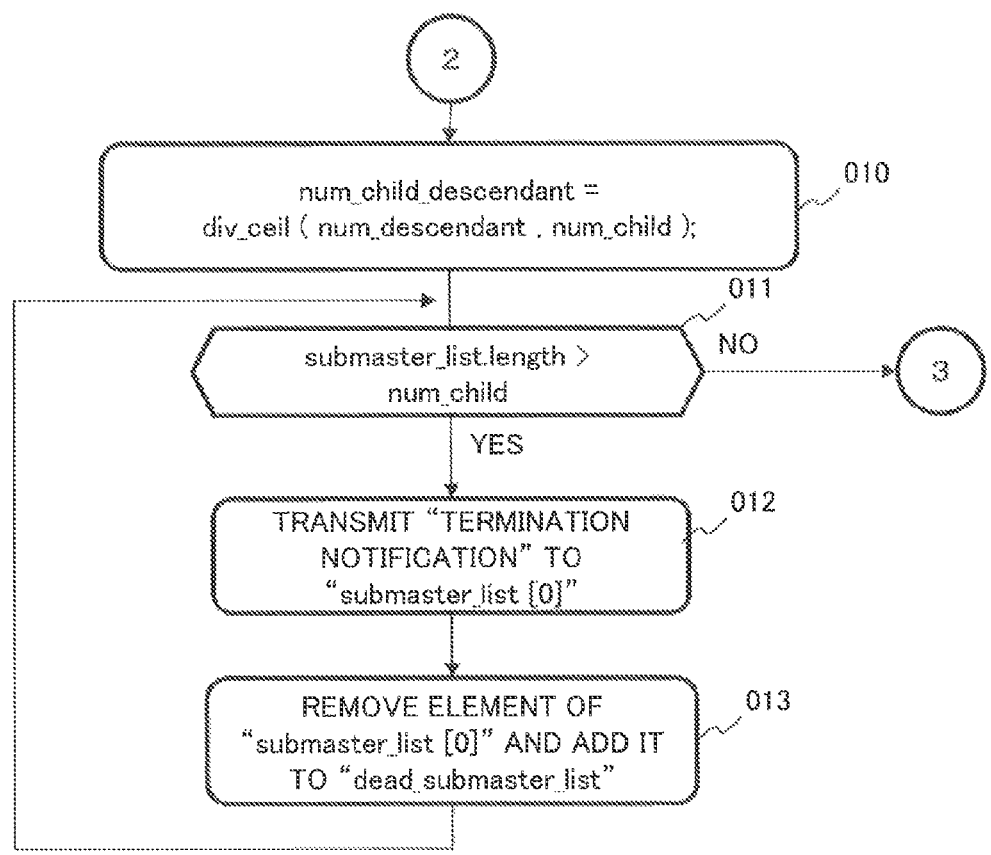
FIG. 6 is a flowchart illustrating the processing in the computing node (CPU) operating as a submaster process.

Each submaster process (at a first layer) positioned immediately lower than the master process (which is a child process of the master process) performs the processing illustrated in FIGS. 4 to 10. At this time, the submaster process receives a request from the master process in 003 (FIG. 4). The request contains "num_child of 2," "num_descendant of 5,000," and "worker_list (a list of 5,000 worker processes)." Each submaster process works out "num_child_descendant of 2,500" in 010 (FIG. 6). The submaster process generates two submaster processes (at a second layer) immediately lower than the submaster itself in the loop in 029 to 032 (FIG. 9) (030). The master process transfers respective rights of management of 2,500 worker processes to each subordinate submaster process (at the second layer).

In 033 and 034 (FIG. 10), requests are sent to the respective computing nodes N to operate as the immediate lower submaster processes, and the computing nodes N operate as submaster processes (at the second layer). With this, the submaster processes (at the second layer) operate. The generated submaster processes at the second layer execute the processing illustrated in FIGS. 4 to 10, thereby each having two submaster processes (at a third layer) subordinate to the submaster process. With repetition of such an operation, the hierarchical structure of submaster processes as illustrated in FIG. 3 is formed. At this time, a right of management of a worker process is transferred to a submaster process at a lower layer.

Target values, of which each submaster process at a 13th layer is notified, are "num_child of 2" and "num_descendant of 2," and a worker list named "worker_list" includes a piece (or pieces of information) on one (or two) worker process(es). In this case, the condition in 029 (FIG. 9) is not satisfied, and a negative judgment is made. Thus, no submaster process is generated at a 14th layer, and (8,192) submaster processes positioned at the 13th layer each monitor one or two of the 10,000 worker processes (see FIG. 3).

Since the master process and the submaster processes each generate a submaster process immediately lower than the process and request the submaster process to manage (monitor) a worker process in the processing in 022 to 028, the process may lighten (reduce) a monitoring load on itself. At a time point when worker processes are arranged lower than submaster processes at the lowermost layer, a monitoring cost (the number of processes as objects to be monitored) borne by each of the master process and the submaster processes falls within a range not more than a target value of 2. The monitoring costs of the processes may be uniformly distributed. That is, prolongation of a total monitoring time period may be suppressed. This contributes to faster job execution.

A submaster process may be terminated through executing the loop processing in 011 to 013 or the processing in 014 to 021 of FIG. 7 in execution of the processing illustrated in FIGS. 4 to 10. The computing node N that has become empty upon termination of a submaster process may be used to execute a worker process. It is thus possible to enhance the efficiency of computing node utilization.

Execution of a subtask by a generated worker process advances job execution. When execution of a subtask terminates, a worker process returns an execution result to a high-order process (a submaster process or the master process) and disappears. When an unexecuted subtask (e.g., a subtask which utilizes a result of execution of a given subtask) becomes executable, the master process generates a worker process for executing the subtask and causes the worker process to execute the subtask.

As described above, with advancement of job execution, the total number of worker processes present on the plurality of computing nodes N changes. The master process may transmit a request including "num_descendant" updated with a change in the total number of worker processes to a lower-ranking process with appropriate timing. Typically, when the master process generates a new worker process, the master process arranges the worker process immediately lower than the master process and moves an arrangement position of the worker process to a lower-ranking process in accordance with a value of "num_child." Alternatively, the master process transmits a request including "num_descendant" updated so as to decrease the number of layers to a lower-ranking process on the basis of decrease in worker processes.

Thus, the ratio of computing nodes N, to which the master process and submaster processes are allocated, to a group of computing nodes used for job execution may be made smaller than the ratio of computing nodes N, to which worker processes are allocated. This allows maintenance of a state in which the computing nodes N are efficiently utilized. Additionally, computing nodes may be saved for a new worker process.

Alternatively, the master process may transmit a request including the value of "num_child" updated with appropriate timing with increase or decrease in worker processes to a lower-ranking process. For example, the value of "num_child" may be increased with decrease in the number of worker processes or decreased with increase in the number of worker processes. Even in this case, the numbers of processes monitored by (arranged immediately lower than) the master process and submaster processes are uniform among the master process and submaster processes. This maintains uniform monitoring costs.

In the embodiment, the hierarchical structure formed of the master process, submaster processes, and worker processes is managed in a distributed manner by the memories 12 of the plurality of computing nodes N operating as the master process and the submaster processes.

As described above, the master process and submaster processes each manage a piece of information on an immediate lower subordinate process (a submaster process or a worker process) with a worker list named "worker_list" and a submaster list named "submaster_list" (FIG. 12). The worker list "worker_list" and the submaster list "submaster_list" are stored in the memory 12 of the computing node N operating as the master process or the computing node N operating as a submaster process.

The master process and submaster processes may each generate a submaster process immediately lower than the process itself. The generation is performed by the computing node N operating as the master process or a submaster process through requesting the empty computing node N to operate as a new submaster process. In the computing node N operating as the master process, addresses of the other computing nodes N are known. At this time, apiece of information on the new submaster process is added as an information element of a submaster list (the memory 12) that manages the master process or the submaster process. With this addition, the hierarchical structure is changed.

The computing node N (the CPU 11) operating as the master process or the submaster process that has generated the new submaster process sends a piece of information on a worker process to be managed by the new submaster process. The CPU 11 of the computing node N operating as the new submaster process may recognize a position where the process higher in rank than the new submaster process is present from, for example, a source address at the time of the request. The CPU 11 adds the piece of information on the worker process to a worker list (FIG. 12) on the memory 12. With this addition, an arrangement position of the worker process is changed from the high-order process to the immediate lower submaster process.

To cause an immediate lower submaster process to disappear, the computing node N (the CPU 11) operating as the master process or a submaster process transmits a termination notification to the computing node N operating as the immediate lower submaster process and deletes a piece of information on the submaster process as an object to be terminated from a submaster list (FIG. 6) stored in the memory 12. With this deletion, the submaster process is dead and absent from the hierarchical structure. Note that, during a period from the transmission of the termination notification to the submaster process to be caused to disappear to reception of a response to the termination notification, the piece of information on the submaster process is registered in a dead submaster list (FIG. 12).

To move a position of the worker process immediately lower than a submaster process to immediately lower than a high-order process, the computing node N operating as the submaster process sends a piece of information on the worker process as an object to be moved to the computing node N operating as the high-order process. At this time, the computing node N deletes the piece of information on the worker process as the object to be moved from a worker list (FIG. 12) in the memory 12. The computing node N having received the piece of information on the worker process adds the piece of information on the worker process to a worker list (FIG. 12) stored in the memory 12. With this addition, the arrangement position of the worker process is changed to the high-order process. At this time, for example, the computing node N operating as the high-order process notifies the computing node N operating as the worker process. With this notification, the computing node N may know an address of the high-order process and may send a termination notification to the high-order process at the time of termination of the worker process. The CPU 11 of the high-order process having received the termination notification deletes the piece of information on the worker process corresponding to the termination notification from the worker list in the memory 12. With this deletion, the worker process is dead and absent from the hierarchical structure.

As described above, each computing node N may recognize a high-order process in the hierarchical structure by managing addresses of sources of a notification and a request in the memory 12. Each computing node N manages pieces of information on immediate lower subordinate submaster processes and worker processes with a submaster list and a worker list stored in the memory 12. The computing nodes N may change an arrangement position of a worker process in the hierarchical structure by exchanging a piece of information on the worker process between the computing nodes N. Each computing node N operating as the master process or a submaster process updates the submaster list stored in the memory 12 of the node itself. With this update, a submaster process newly appears or disappears.

According to the embodiment, in each (a monitoring process) of a master process and submaster processes, processing which changes a monitoring hierarchical structure is executed on the basis of a target value for the total number of subordinate worker processes (a first target value) and a target value for the number of immediate lower subordinate processes (a second target value). With this execution, it is possible to take into account a trade-off between the immediacy of process monitoring and node utilization efficiency in accordance with the number of worker processes that changes during job execution and maintain a better process hierarchical structure. In other words, it is possible to suppress a monitoring load and achieve improvement in the efficiency of computing node utilization. Thus, efficient utilization of computing resources in a parallel computer system and faster job execution owing to efficient resource allocation may be achieved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A parallel computer system, comprising:
a plurality of computing nodes capable of executing a parallel program for generating a plurality of computing processes that perform respective predetermined computations and a plurality of monitoring processes,
the plurality of computing processes and the plurality of monitoring processes are allocated to the plurality of computing nodes,
the plurality of computing nodes form a monitoring hierarchical structure having two or more layers, each of the plurality of monitoring processes being capable of monitoring predetermined number of subordinate processes that are in a layer immediately lower than a layer that each of the plurality of monitoring processes exists, the subordinate processes including at least one of a monitoring process among the plurality of monitoring processes and a computing process among the plurality of computing processes,
each node among the plurality of computing nodes operating as each of the plurality of monitoring processes performs processing that changes the monitoring hierarchical structure based on a first target value and a second target value, the first target value serving as a target value for total number of subordinate computing processes of each of the plurality of monitoring processes, the subordinate computing processes being in layers lower than a layer that a corresponding monitoring process among the plurality of monitoring processes exists and the subordinate computing processes connecting to the corresponding processes directly or indirectly, the second value serving as a target value for number of the subordinate processes of each of the plurality of monitoring processes, the second value being equal to the predetermined number, and
the first target value is calculated using a formula of "total number of computing processes in the monitoring hierarchical structure/(the second target value)$^n$", and the exponent "n" in the formula indicates a value of a layer that each of the plurality of monitoring processes exists in the monitoring hierarchical structure and the second target value is constant.

2. The parallel computer system according to claim 1, wherein each node among the plurality of computing nodes operating as each of the plurality of monitoring processes controls generation and disappearance of a monitoring process included in the subordinate processes and rearrangement of a computing process associated with the generation and the disappearance of the monitoring process included in the subordinate processes, as the processing that changes the monitoring hierarchical structure.

3. The parallel computer system according to claim 1, wherein the plurality of computing nodes include a first computing node operating as a first monitoring process among the plurality of monitoring processes, the first monitoring process has the subordinate computing processes exceeding the first target value, and the first computing node determines to change an arrangement position of an excess of a computing process over the first target value so that the excess becomes subordinate processes of a monitoring process that is a high-order process of the first monitoring process.

4. The parallel computer system according to claim 1, wherein the plurality of computing nodes include a first computing node operating as a first monitoring process among the plurality of monitoring processes, and when the number of the first monitoring process has subordinate processes including a computing process, the number of subordinate processes of the first monitoring process exceeds the second target value, and a second monitoring process existing a layer immediately lower than a layer that the first monitoring process exists has subordinate processes of which falls below the second target value, the first computing node determines to change a computing process included in the subordinate processes of the first monitoring process into the subordinate processes of the second monitoring process so that the number of subordinate processes of the second monitoring process does not exceed the second target value.

5. The parallel computer system according to claim 1, wherein the plurality of computing nodes include a first computing node operating as a first monitoring process among the plurality of monitoring processes, and when number of monitoring processes included in subordinate processes of the first monitoring process falls below the second target value and number of subordinate processes of a second monitoring process among the monitoring processes included in the subordinate processes of the first monitoring process exceeds the second target value, the first computing node generates a new monitoring process included in the subordinate processes of the first monitoring process and determines to change a part or all of computing processes included in the subordinate processes of the second monitoring process into subordinate processes of the new monitoring process.

6. The parallel computer system according to claim 1, wherein the plurality of computing nodes include a first computing node operating as a first monitoring process among the plurality of monitoring processes, and when number of subordinate processes of a second monitoring process existing a layer immediately lower than a layer that the first monitoring process exists does not exceed the second target value even after changing all computing processes included in the subordinate processes of the second monitoring process into subordinate processes of the first monitoring process, the first computing node determines to terminate the second monitoring process and changes all of the computing processes of the second monitoring process into the subordinate processes of the first monitoring process.

7. The parallel computer system according to claim 1, wherein the plurality of computing nodes include a first computing node operating as a first monitoring process among the plurality of monitoring processes determines on a value obtained by dividing the first target value by the second target value supplied to the first monitoring process as the second target value of a second monitoring process existing a layer immediately lower than a layer that the first monitoring process exists.

8. The parallel computer system according to claim 1, wherein the plurality of computing nodes include a first computing node operating as a first monitoring process among the plurality of monitoring processes, and when number of monitoring processes included in subordinate processes of the first monitoring process exceeds the second target value, the first computing node determines to terminate at least one of the monitoring processes included in the subordinate processes of the first monitoring process such that the number of monitoring processes included in the subordinate processes of the first monitoring process is not more than the second target value.

9. A non-transitory computer-readable recording medium having stored therein a program for causing a plurality of computing nodes to execute a process comprising:
generating a plurality of computing processes that perform respective predetermined computations and a plurality of monitoring processes, the plurality of computing processes and the plurality of monitoring processes are allocated to the plurality of computing nodes; and
forming a monitoring hierarchical structure having two or more layers, each of the plurality of monitoring processes being capable of monitoring predetermined number of subordinate processes that are in a layer immediately lower than a layer that each of the plurality of monitoring processes exists, the subordinate processes including at least one of a monitoring process among the plurality of monitoring processes and a computing process among the plurality of computing processes,
the program causing each node among the plurality of computing nodes operating as each of the plurality of monitoring processes to execute processing including
performing processing that changes the monitoring hierarchical structure based on a first target value and a second target value, the first target value serving as a target value for total number of subordinate computing processes corresponding to each of the plurality of monitoring processes, the subordinate computing processes being in layers lower than a layer that a corresponding monitoring process among the plurality of monitoring processes exists and connecting to the corresponding monitoring process directly or indirectly, the second value serving as a target value for number of the subordinate processes of each of the plurality of monitoring processes, the second value being equal to the predetermined number,
the first target value is calculated using a formula of "total number of computing processes in the monitoring hierarchical structure/(the second target value)$^n$", and the exponent "n" in the formula indicates a value of the layer that each of the plurality of monitoring processes exists in the monitoring hierarchical structure and the second target value is constant.

10. A method of controlling a parallel computer system including a plurality of computing nodes the method comprising:
the plurality of computing nodes generating a plurality of computing processes that perform respective predetermined computations and a plurality of monitoring processes by executing a parallel program, the plurality of computing processes and the plurality of monitoring processes are allocated to the plurality of computing nodes;
the plurality of computing nodes forming a monitoring hierarchical structure having two or more layers, each of the plurality of monitoring processes being capable of monitoring predetermined number of subordinate processes that are in a layer immediately lower than a layer that each of the plurality of monitoring processes exists, the subordinate processes including at least one of a monitoring process among the plurality of monitoring processes and a computing process among the plurality of computing processes; and
each node among the plurality of computing nodes operating as each of the plurality of monitoring processes performing processing that changes the monitoring hierarchical structure based on a first target value and a second target value, the first target value serving as a target value for total number of subordinate computing processes corresponding to each of the plurality of monitoring processes, the subordinate computing processes being in layers lower than the layer that a corresponding monitoring process among the plurality of monitoring processes exists and the subordinate computing processes connecting to the corresponding monitoring process directly or indirectly, the second value serving as a target value for the number of subordinate processes of each of the plurality of monitoring processes, the second value being equal to the predetermined number,
the first target value is calculated using a formula of "total number of computing processes in the monitoring hierarchical structure/(the second target value)$^n$", and the exponent "n" in the formula indicates a value of a layer that each of the plurality of monitoring processes exists in the monitoring hierarchical structure and the second target value is constant.

* * * * *